(12) United States Patent
Piety et al.

(10) Patent No.: US 9,927,285 B2
(45) Date of Patent: Mar. 27, 2018

(54) MULTI-UNIT DATA ANALYZER

(71) Applicant: Azima Holdings, Inc., Woburn, MA (US)

(72) Inventors: Kenneth Ralph Piety, Knoxville, TN (US); Dana Kendrick Martin, Poulsbo, WA (US); Robert Scott Raber, Kingston, WA (US)

(73) Assignee: Azima Holdings, Inc., Woburn, MA (US)

( * ) Notice: Subject to any disclaimer, the term of this patent is extended or adjusted under 35 U.S.C. 154(b) by 625 days.

(21) Appl. No.: 13/662,146

(22) Filed: Oct. 26, 2012

(65) Prior Publication Data

US 2014/0121996 A1    May 1, 2014

(51) Int. Cl.
    *G01B 3/00*     (2006.01)
    *G01H 1/00*     (2006.01)

(52) U.S. Cl.
    CPC ..................... *G01H 1/00* (2013.01)

(58) Field of Classification Search
    CPC .................................................. G01N 29/44
    USPC .......................................................... 702/33
    See application file for complete search history.

(56) References Cited

U.S. PATENT DOCUMENTS

| | | |
|---|---|---|
| 4,520,674 A | 6/1985 | Canada et al. |
| 5,115,406 A | 5/1992 | Zatezelo et al. |
| 5,583,801 A | 12/1996 | Croyle et al. |
| 5,991,726 A | 11/1999 | Immarco et al. |
| 6,006,164 A | 12/1999 | McCarty et al. |
| 6,078,874 A * | 6/2000 | Piety ...................... G01H 1/003 702/122 |
| 6,220,098 B1 * | 4/2001 | Johnson et al. ................. 73/592 |
| 6,297,742 B1 | 10/2001 | Canada et al. |
| 6,343,251 B1 | 1/2002 | Herron et al. |
| 6,421,571 B1 | 7/2002 | Spriggs et al. |
| 6,549,869 B1 | 4/2003 | Piety et al. |
| 6,556,956 B1 * | 4/2003 | Hunt ............................. 702/188 |
| 6,735,549 B2 | 5/2004 | Ridolfo |
| 6,834,256 B2 | 12/2004 | House et al. |
| 6,853,934 B2 * | 2/2005 | Nagamatsu ..................... 702/77 |
| 7,158,919 B2 | 1/2007 | Wright et al. |
| 7,240,010 B2 | 7/2007 | Papadimitriou et al. |
| 7,479,876 B2 | 1/2009 | Carle et al. |
| 7,676,285 B2 | 3/2010 | Hoyte et al. |

(Continued)

*Primary Examiner* — Stephanie Bloss
(74) *Attorney, Agent, or Firm* — Pitts & Lake, P.C.

(57) ABSTRACT

A vibration analysis system including a sensor to be coupled to a machine to measure vibration data, a data acquisition and processing unit to communicate with the sensor to receive the measured vibration data from the sensor and to perform test operations on the received vibration data to calculate vibration parameters, and at least one control unit to transmit operation requests instructing the data acquisition and processing unit to start receiving the vibration data from the sensor, to perform test operations, and to transmit corresponding vibration parameters over a wireless communication link to the control unit. The data acquisition and processing unit includes a data management unit such that when the communication link is broken, the data acquisition and processing unit continues to perform the test operations, and when the communication link is reestablished, the data management unit transmits the vibration parameters to the control unit.

28 Claims, 7 Drawing Sheets

(56) References Cited

U.S. PATENT DOCUMENTS

| | | | |
|---|---|---|---|
| 7,851,758 B1* | 12/2010 | Scanlon | G01J 5/02 |
| | | | 250/330 |
| 2003/0204371 A1 | 10/2003 | Sciamanna | |
| 2004/0263342 A1 | 12/2004 | Matlock et al. | |
| 2005/0080620 A1 | 4/2005 | Rao et al. | |
| 2006/0259271 A1 | 11/2006 | House et al. | |
| 2007/0174022 A1* | 7/2007 | Wiles et al. | 702/183 |
| 2007/0200722 A1 | 8/2007 | Piety et al. | |
| 2009/0024359 A1 | 1/2009 | Bibelhausen et al. | |
| 2009/0295561 A1 | 12/2009 | Hu et al. | |
| 2010/0076714 A1 | 3/2010 | Discenzo | |
| 2011/0056723 A1* | 3/2011 | Slippy et al. | 174/73.1 |

\* cited by examiner

MULTI-UNIT DATA ANALYZER

CROSS-REFERENCE TO RELATED APPLICATIONS

N/A

FIELD OF INVENTION

The present general inventive concept relates to predictive maintenance programs for industrial applications, and, more particularly, to a predictive maintenance system that accommodates a plurality of handheld operator control units in selective wireless communication with a data acquisition unit.

BACKGROUND

Predictive Maintenance, or PdM, programs in industrial plants are frequently implemented by assigning a technician to use portable instrumentation, such as a vibration analyzer, an ultrasonic gun, and/or an IR camera, along a predetermined route to collect data related to the operation of the equipment on this route. This information, in turn, may then be used to diagnose problems or potential problems associated with the health and/or operation of the equipment. An example system and method for data collection relevant to machine operating conditions is disclosed in U.S. Pat. No. 6,078,874, entitled "Apparatus and Method for Machine Data Collection," the contents of which are incorporated by reference herein.

For example, a PdM program may include a technician carrying a data acquisition unit, e.g., a vibration analyzer, to each machine located along a defined route. Upon reaching a particular machine to be analyzed, a vibration sensor, such as an accelerometer, is physically coupled to the machine at one or more measurement locations. Frequently, the data to be acquired at each measurement location is specified as part of the route instructions. The vibration sensor then receives vibration data from the measurement locations, and may output this information to the data acquisition unit for processing.

Historically, the portable vibration analyzers used in PdM programs have been dedicated instruments designed as a single unit which performs all the necessary functions for navigating a route of machines, acquiring and reviewing data, and storage of the data for later transfer to a host workstation. The software to perform detailed diagnostic reviews of the data reside on the host workstation. The vibration analyzers were designed with integral displays and keypads to enable the operator to control the operation of the instrument. The internal components of these conventional vibration analyzers typically include a central microprocessor, signal conditioning and data acquisition circuits, and digital signal processing software and/or hardware. This type of design has been used by virtually every manufacturer of portable vibration analyzers. The popularity of the single unit design has been based on the desire to offer a rugged, compact and portable, high performance instrument with the lowest production costs. Instruments of this design have been sold by such manufacturers as Emerson\CSI, SKF, Pruftechnik, GE\Commtest, and others for the past 25 years.

Clearly, the conventional single unit design offers many advantages; however, there are also disadvantages to this configuration. The portability of the unit and the size of the display/keypad on the front panel present conflicting requirements. Vibration time waveform and spectral data may include 400 to 25,600 values and are viewed in a graphical format. Viewing such graphical displays on a small screen is challenging. Additionally, because of the variety of functions present in the analyzers, control buttons and alphanumeric keypads would be desirable. However, complex keypads will generally not fit on the front panel space available. As a result, the size of the instrument is often controlled by the space designed for display and control functions. Clearly, the two primary design characteristics of the instrument that impact its convenience in use by the operator, are at odds with each other. It is desirable for the field technician who may be collecting data from 400-800 locations in a typical shift to have a small, highly portable, instrument; and the operator is often willing to sacrifice screen size and user interface buttons because he is performing very repetitive tasks with the expectation that the analysis of this data will be performed at the host workstation. However, the second primary use of the analyzer is to perform troubleshooting on machines to determine if a problem exists and to identify the fault conditions. This work is often focused on one machine and may involve a large number of measurements which are reviewed in the field. One measurement may lead to others until the source of any abnormal conditions are understood and documented. This analysis process is more properly performed with a more detailed display and control interface. Thus, it is difficult to satisfy the goal of both simple portability and the ability to perform more detailed analysis fully with one instrument.

Another drawback to the single unit design has been inflexibility and complexity of the development process. Each design is a dedicated computer with special data acquisition and processing hardware. Each time a new product or a new generation of an existing model is developed, another development cycle of typically 1-3 years is required, and at considerable expense. The extended development cycle for a new analyzer is a deterrent to innovation because of inherent limitations of the existing hardware platform which typically have a product lifetime of 5-10 years to recoup the development costs. The current practice for introducing new laptop or tablet computers, PDAs, and cell phones is rapid innovation resulting in new versions with new capabilities available each year. The PdM instrument marketplace does not represent the volume of sales that drives the development of commercial computing and communications electronics. However, the introduction of a new design paradigm for PdM instrumentation can lead to a faster design cycle which results in a more flexible and dynamic product evolution.

Yet another drawback to the conventional single unit design is the occasion when the technician wishes to avoid hostile conditions during data acquisition and processing. Typically, the vibration analyzer and the vibration sensor are coupled together by a signal cable which is relatively short to make it easy to transport. In most cases, the technician will be within 3-8 feet of the measurement location during data acquisition and processing. In circumstances where the access to the specified measurement location on a particular machine is cumbersome, uncomfortable, or even unsafe for the technician, it may be desirable to move to a position at a greater distance during data collection. Accordingly, there exists a need in the art for a predictive maintenance system that includes a data acquisition unit in wireless communication with one or more operator control units that allow the technician to remotely control the data acquisition unit, as well as to receive acquired and/or processed data from the data acquisition unit.

BRIEF SUMMARY

The present general inventive concept provides a system to allow remote data collection from a data acquisition and processing unit in communication with a vibration sensor unit that is fixed to a machine. A separate control unit specifies what measurements are to be collected by the data acquisition and processing unit via a communications link. The control unit will specify one or more sets of measurements to be made, the type of data to be returned and the type of data to be stored in the acquisition unit. According to various example embodiments, the data acquisition and processing unit performs a plurality of data processing operations asynchronously to improve efficiency, and continues to perform such operations in the event that the communication link with control unit is lost. If a loss of the communication link occurs, then reestablishing the link will initiate the transfer of the requested data back to the control unit.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by a vibration analysis system including a sensor to be coupled to a machine to measure vibration data, a data acquisition and processing unit to communicate with the at least one sensor to receive the measured vibration data from the at least one sensor and to perform a plurality of test operations on the received vibration signals to calculate vibration parameters of the received vibration data, and at least one control unit to transmit at least one operation request instructing the data acquisition and processing unit to start receiving the vibration data from the sensor, to perform one or more of the plurality of test measurements, and to transmit at least one corresponding vibration parameter over a wireless communication link to the control unit, wherein the data acquisition and processing unit includes a data management unit such that when the communication link is broken, the data acquisition and processing unit continues to perform the one or more test operations, and when the communication link is reestablished, the data management unit transmits the at least one vibration parameter to the control unit.

The data acquisition and processing unit may perform the test operations asynchronously.

The data acquisition and processing unit may store any portion of the at least one vibration parameter not transmitted before the communication link is broken, and may transmit the stored portion when the communication link is reestablished.

The sensor may be a triaxial sensor, and the calculated vibration parameters may be measured from multiple signal channels connected sensors that correspond to the three orthogonal axes of vibration.

The control unit may be a portable computing device.

The control unit may be a personal digital assistant (PDA), cell phone, tablet computer, or laptop computer.

The data acquisition and processing unit may receive control instructions from a user exclusively through the control unit.

The data acquisition and processing unit may selectively communicate with a plurality of control units.

The data acquisition and processing unit may selectively transmit the measured vibration data and/or the calculated vibration parameters to a selected one of the plurality of control units.

The foregoing and/or other aspects and advantages of the present general inventive concept may also be achieved by a multi-unit portable vibration analysis instrument including a sensor to be coupled to a machine to measure vibration data, a data acquisition and processing unit to communicate with the at least one sensor to receive the measured vibration data from the at least one sensor and to perform a plurality of test operations on the received vibration signals to calculate vibration parameters of the received vibration data, and two or more control units with physical characteristics adapted to specific use cases each which is able to transmit at least one operation request instructing the data acquisition and processing unit to start receiving the vibration data from the sensor, to perform one or more of the plurality of test operations, and to transmit at least one corresponding vibration parameter over a wireless communication link to the control unit.

The data acquisition and processing unit may selectively transmit and act as web server and interface with control units executing standard browser applications.

The foregoing and/or other aspects and advantages of the present general inventive concept may also be achieved by a portable vibration analyzer used in condition monitoring programs to collect data from a predefined set of machines on a route including a sensor to be coupled to a machine to measure vibration data, a data acquisition and processing unit to communicate with the at least one sensor to receive the measured vibration data from the at least one sensor and to perform a plurality of test operations on the received vibration signals to calculate vibration parameters of the received vibration data, and a control unit to transmit at least one operation request instructing the data acquisition and processing unit to start receiving the vibration data from the sensor, to perform one or more of the plurality of test operations, and to transmit at least one corresponding vibration parameter over a wireless communication link to the control unit, wherein the data acquisition and processing unit is physically separated from the control unit and the data acquisition unit and attached sensors are carried in a belt pouch or some other pocketed position on the body of the operator separate from the control unit.

The data acquisition and processing unit may be set down by a machine-under-test such that the operator can acquire measurement data from the data acquisition and processing unit while standing with the control unit at distances of 30 feet or more from the machine.

The data acquisition and processing unit and all associated sensors and sensor cabling may be completely enclosed in a belt pouch so that no cables are exposed creating a safety hazard when traversing from one machine to another on the route.

The data acquisition and processing unit may be mounted in a pouch such that the cable or the pouch will break away from the operator if the sensor or cable are snagged creating a safety hazard.

The foregoing and/or other aspects and advantages of the present general inventive concept may also be achieved by a method of vibration analysis, the method including coupling a sensor to a machine to measure vibration data, placing a data acquisition and processing unit in close proximity to the machine, the data acquisition and processing unit being in electrical communication with the sensor, to receive the measured vibration data from the vibration sensor and to perform a plurality of test operations on the received vibration signals to calculate vibration parameters of the received vibration data, controlling the data acquisition and processing unit, from a location remote from the machine, with a portable control unit that transmits at least one operation request instructing the data acquisition and processing unit to start receiving the vibration data from the sensor, to perform one or more of the plurality of test operations, and to transmit at least one corresponding vibration parameter over a wireless communication link to the control unit, wherein the data acquisition and processing unit includes a data management unit such that when the communication link is broken, the data acquisition and processing unit continues to perform the one or more test operations, and when the communication link is reestablished, the data management unit transmits the at least one vibration parameter to the control unit.

Other features and aspects may be apparent from the following detailed description, the drawings, and the claims.

BRIEF DESCRIPTION OF THE FIGURES

The following example embodiments are representative of example techniques and structures designed to carry out the features of the present general inventive concept, but the present general inventive concept is not limited to these example embodiments. Moreover, in the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
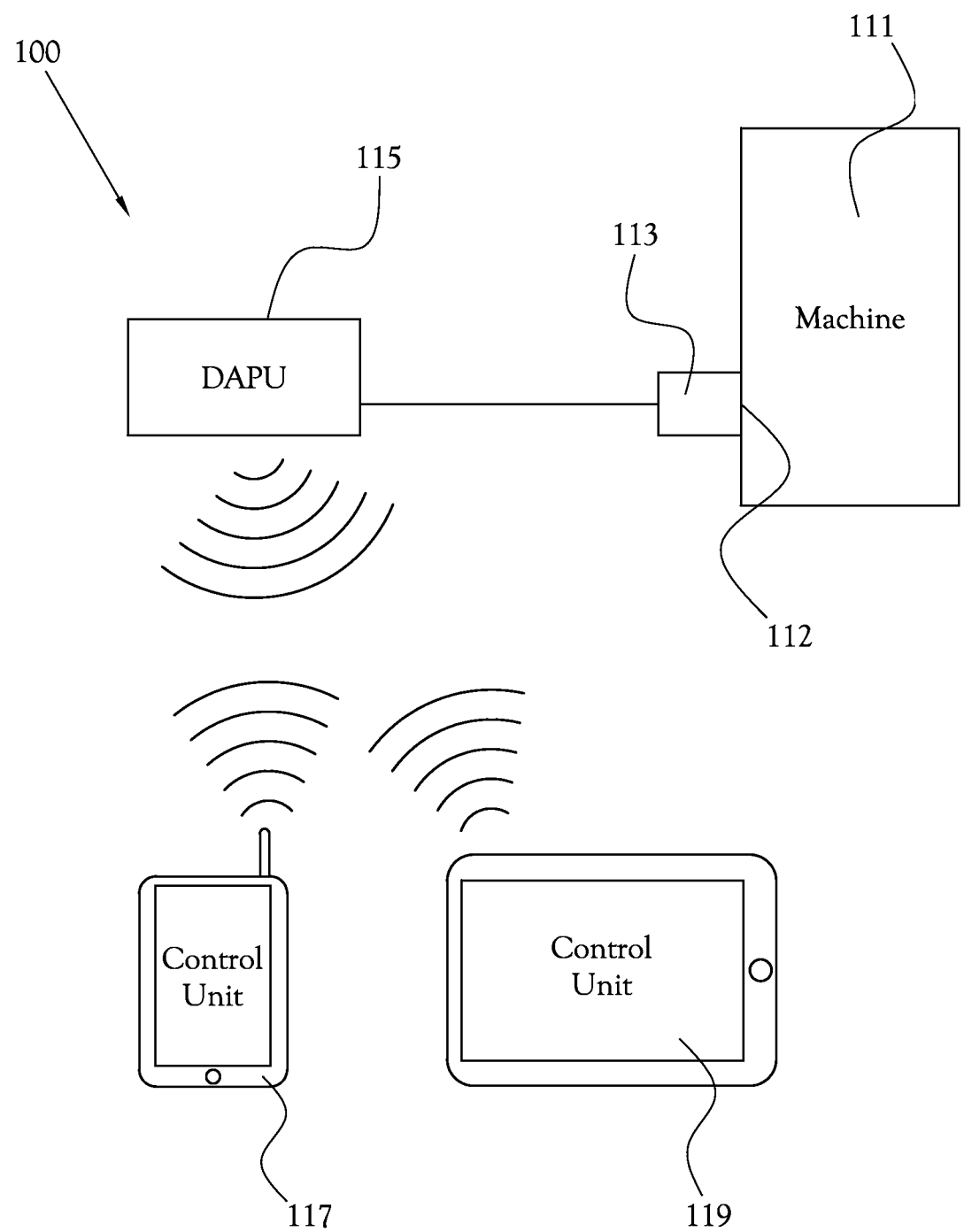
FIG. 1 illustrates an example of a machine analysis system according to an embodiment of the present general inventive concept.

Reference will now be made to example embodiments of the present general inventive concept, examples of which are illustrated in the accompanying drawings and illustrations. The example embodiments described herein are presented in order to explain the present general inventive concept by referring to the figures.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The described progression of processing operations described are merely examples, however, and the sequence of operations is not limited to that set forth herein and may be changed as is known in the art, with the exception of operations necessarily occurring in a certain order. Also, description of well-known functions and constructions may be omitted for increased clarity and conciseness.

It is noted that the following detailed description may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept.

Various example embodiments of the present general inventive concept provide a machine analysis system including at least one machine sensor, a portable data acquisition unit that is coupled to the machine sensor to receive and process data related to performance conditions of the machine, and one or more handheld operator control units in selective communication with the data acquisition unit to control the data acquisition unit and to receive and/or further process the data and display the data to an operator or technician. In various example embodiments, the one or more handheld operator control units include a first handheld unit adapted to receive data necessary to convey to the technician whether a certain test was completed successfully or whether further analysis should be performed, and a second handheld unit adapted to receive and/or further process larger amounts of data. Examples of handheld units may include personal digital assistants (PDAs), cell phones, dedicated handheld devices, tablet computers, laptop computers, and so on.

The present general inventive concept provides a two unit design for PdM analyzers. The analyzer includes a control unit which may be any of a number of processing devices, such as, for example, a general purpose tablet computer, a PDA, a smartphone, and the like, and a separate data acquisition and processing unit (which may be referred to simply as the data acquisition unit, or the DAPU, at various times in the following descriptions). The two units may communicate via a wired connection or through a wireless link. This allows remote data collection from a data acquisition unit in communication with a vibration sensor that is fixed to a machine. It also means that a single instrument can be packaged with multiple control units which are suited to the various different uses desired in a portable PdM vibration analyzer. It also allows the weight of the data acquisition unit and sensors to be conveniently holstered on the field technician, thus reducing the weight of the control unit that must be readily accessible and constantly manipulated by hand.

Simply stated, the control unit may communicate with the data acquisition unit to control functions performed by, and to receive data from, the data acquisition unit, while the data acquisition unit is responsible for receiving data from the sensor and performing various data processing functions according to the control unit. The functions and capabilities provided to the data acquisition unit are quite robust and allow for a wide range of data collections. These functions can meet the requirements for PdM route collection, troubleshooting investigations, operating deflection shape and modal analysis measurements, and corrective tasks such as balancing. Since the data acquisition unit provides all of the specialized signal processing functions for a variety of tasks, but requires no user interface due to the user and control interaction provided by the control unit, once the data acquisition unit is developed the need for redesign is minimized. The ability to parlay the developments of personal computing and communications devices as potential controller units means innovations in these fields will provide a continuous stream of new features at a lower development cost. In other words, the various developments in processing and communications may be able to be employed in any of the various control units which may be used to interact with the data acquisition unit, so that the data acquisition unit may have a longer usable life compared to the conventional systems.

Another advantage of the multi-unit design is the opportunity for lower instrument maintenance costs and higher instrument availability. The most fragile part of an instrument is typically the display and interface components. In the conventional single unit design, if there is any problem, the entire unit must be returned to the vendor's repair depot. It may take weeks to get the unit back and ready for use. In the multi-unit design, the specific controller or an alternative may be readily available from a number of suppliers at a very low cost. If this controller unit is damaged, it may be as become as convenient as replacing a damaged smart phone which can be accomplished in a short time at a very reasonable price. Thus, the broken unit may replaced, temporarily or permanently, by the same model unit or a similar compatible unit and the appropriate controller software can be downloaded from a web site.

The transition to a two unit design is not without its challenges. In order to keep the performance of the functions provided by analyzer at least on par with the single unit design, several novel design features have been included in the data acquisition and processing unit. Data acquisition units which couple with laptop or tablet computers have been available in recent years, but these units are typically connected to the computer via a wired connection and are not battery powered. A common use case for these units has been for installed vibration monitoring systems. Another common application of these units is for collecting large amounts of data on a number of channels under special test conditions at a single location. Such systems are transportable but are not intended or suitable to be carried around on a PdM route, as they lack the physical characteristics which would make them readily portable such size and power requirements.

Another characteristic of such conventional data acquisition units is the need to maintain active communication with the control unit once data collection is initiated. If the link with the control units is broken, then data acquisition stops. These conventional units are designed to request a single type of data to be collected and this data to be transferred to the control unit as it is available for processing or storage. The units will fail to operate if the link between the units is lost as data is being acquired. This feature is not desirable for a PdM analyzer. Typically, a set of measurements is taken at each measurement location on a PdM route. These measurements may include parameters such as, for example, waveform and spectral data collected under different test settings, demodulation waveform and spectra, overall values, 1×RPM amplitude and phase values, or special high frequency parameters, speed, and the like. These measurements may take, for example, anywhere from 30 seconds to 5 minutes. It is desirable for the field technician to inspect the physical conditions around the machine while he is waiting for the data to be acquired or he may want to observe the data as it is being collected. It is highly undesirable for the data collection process to stop, or for the data that has been collected to be lost, due to a loss of the communication interface. The data acquisition unit according to the present general inventive concept improves upon the performance objectives described above for a portable vibration analyzer.

FIG. 1 illustrates an example of a machine analysis system according to an embodiment of the present general inventive concept. The example machine analysis system 100 of FIG. 1 includes a vibration sensor 113 physically coupled to a machine 111 at a measurement location 112. The vibration sensor 113 may be a single axis or triaxial sensor, and may be fixed to the machine in a variety of locations other than the position that illustrated in FIG. 1. The vibration sensor 113 is in wired communication with a data acquisition unit 115, such that the vibration sensor 113 analog electrical signals which are received by the data acquisition unit 115 for processing, storage, and/or subsequent transmission.

Still referring to FIG. 1, two operator control units 117 and 119 are provided to selectively communicate with the data acquisition unit 115. The operator control units 117 and 119 communicate wirelessly with the data acquisition unit 115. In this example embodiment the first operator control unit 117 is provided to receive processed data from the data acquisition unit 115 and to display the processed data to an operator. The second operator control unit 119 is provided to receive processed data from the data acquisition unit 115, to display the processed data to an operator, to further process the data received at the request of the operator, and to instruct the data acquisition unit 115 to perform additional processing at the request of the operator. The first and second operator control units 117 and 119 may both be used to control various functions of the data acquisition unit 115, and to receive various data transmissions from the data acquisition unit 115 according to the transmitted control signals. However, in the example embodiment illustrated in FIG. 1, the second operator control unit 119 is provided with greater processing power and/or data storage, etc., so as to be better equipped for more complex data gathering and processing. According to various example embodiments of the present general inventive concept, the DAPU 115 is equipped with an architecture that allows various software modules to process data and communicate with various control units, such that various hardware, software, and/or communications developments may be applied to the control units and cooperate with the DAPU 115 without need for corresponding updates of the DAPU 115. Similarly, the software modules of the DAPU 115, which will be discussed in more detail in regard to FIG. 6, may be easily updated through the communication with the control units. As an alternative, various example embodiments of the DAPU 115 may include a wired communication port through which such software updates may be applied.

Figure 2:
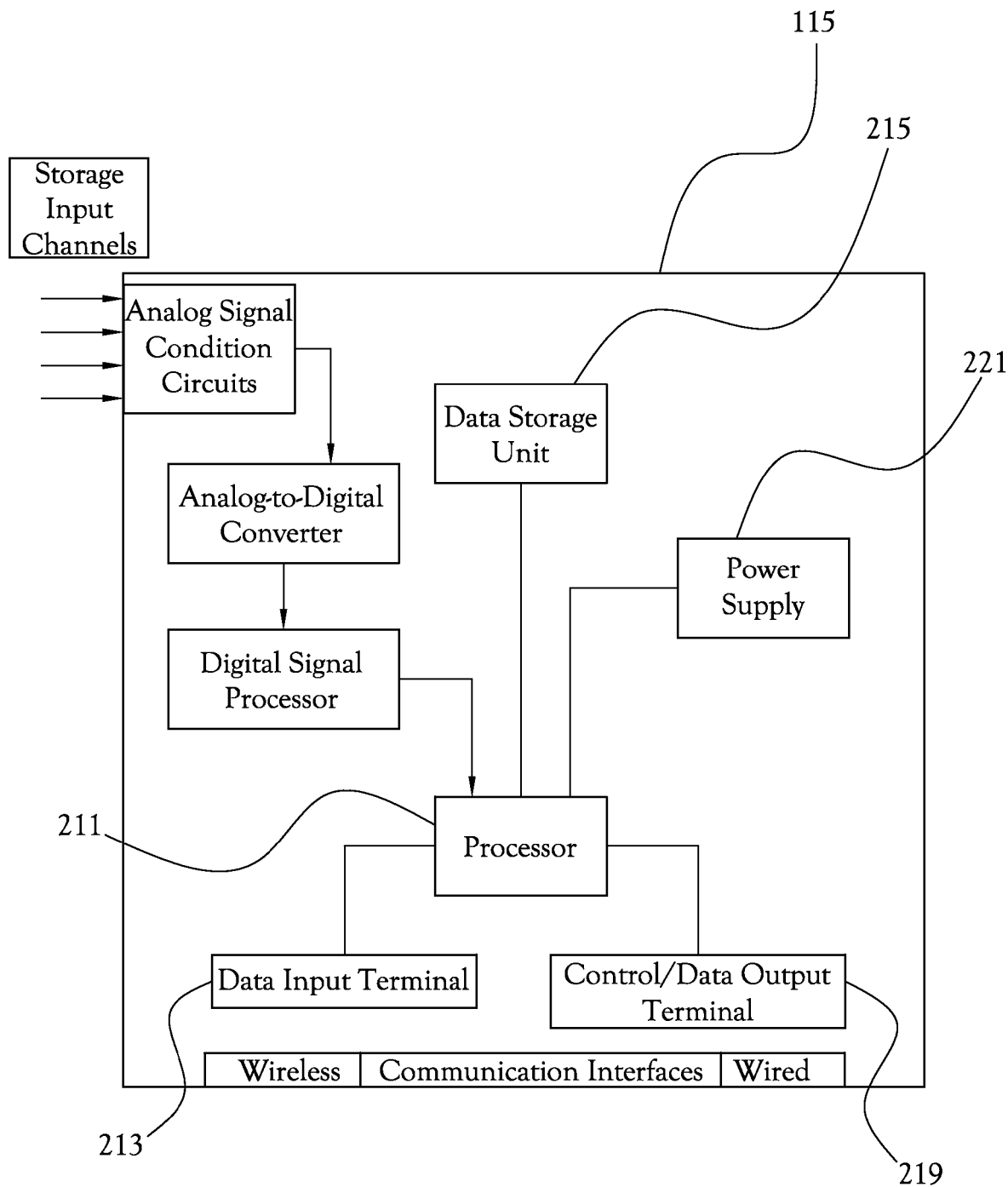
FIG. 2 illustrates the data acquisition unit of FIG. 1 according to an embodiment of the present general inventive concept.

FIG. 2 illustrates the data acquisition unit 115 of FIG. 1 according to an embodiment of the present general inventive concept. In the presently illustrated example embodiment, the data acquisition unit 115 includes a processor 211 in communication with a power supply 221. A data storage unit 215, such as a memory unit, hard drive, buffer, etc., is in communication with the processor 211 to receive and store data for subsequent transmission. The data storage unit 215 may also store various software modules which will be described later, or such modules may be stored in one or more separate memories. These control commands may be received through the control and data output terminal 219, which is also used to transmit processed data to the control unit. In various example embodiments, the data input terminal 213 may be a wire-based terminal adapted to receive a wire or cable connected to the machine sensor. In various example embodiments, the control and data output terminal 219 may includes a wireless transmitter to wirelessly transmit data to one or more handheld operator control units. In various example embodiments, the data acquisition unit 115 may also include a relatively limited display and/or user interface, which may be used for simple diagnostics or interaction with the data acquisition unit 115, though the main control and data communication will be handled through the interface provided to the control unit. Such a limited display/interface may include a Power on/off control and indicator lights to indicate the state of the instrument or operations being performed by the instrument.

It will be understood that the term 'power supply' will refer to any suitable means for providing power to the device. For example, a rechargeable battery (e.g., Ni-Cad or Lithium Ion), non-rechargeable battery, and/or an electrical adapter to draw power from an external power source may be included. Furthermore, the 'data storage unit' may include an internal or external hard disk drive and/or memory. It will be understood that the wireless connection contemplated herein may be achieved in accordance with any suitable wireless technique (e.g., ZigBee, IEEE 802.11, Bluetooth, IrDA, etc.). Additionally, the 'processor' contemplated in the instant application performs the functionality of the device and may also include an analog-to-digital converter to convert raw data received from the sensors to digital values and digital processing hardware or software to perform subsequent measurement calculations.

Figure 3:
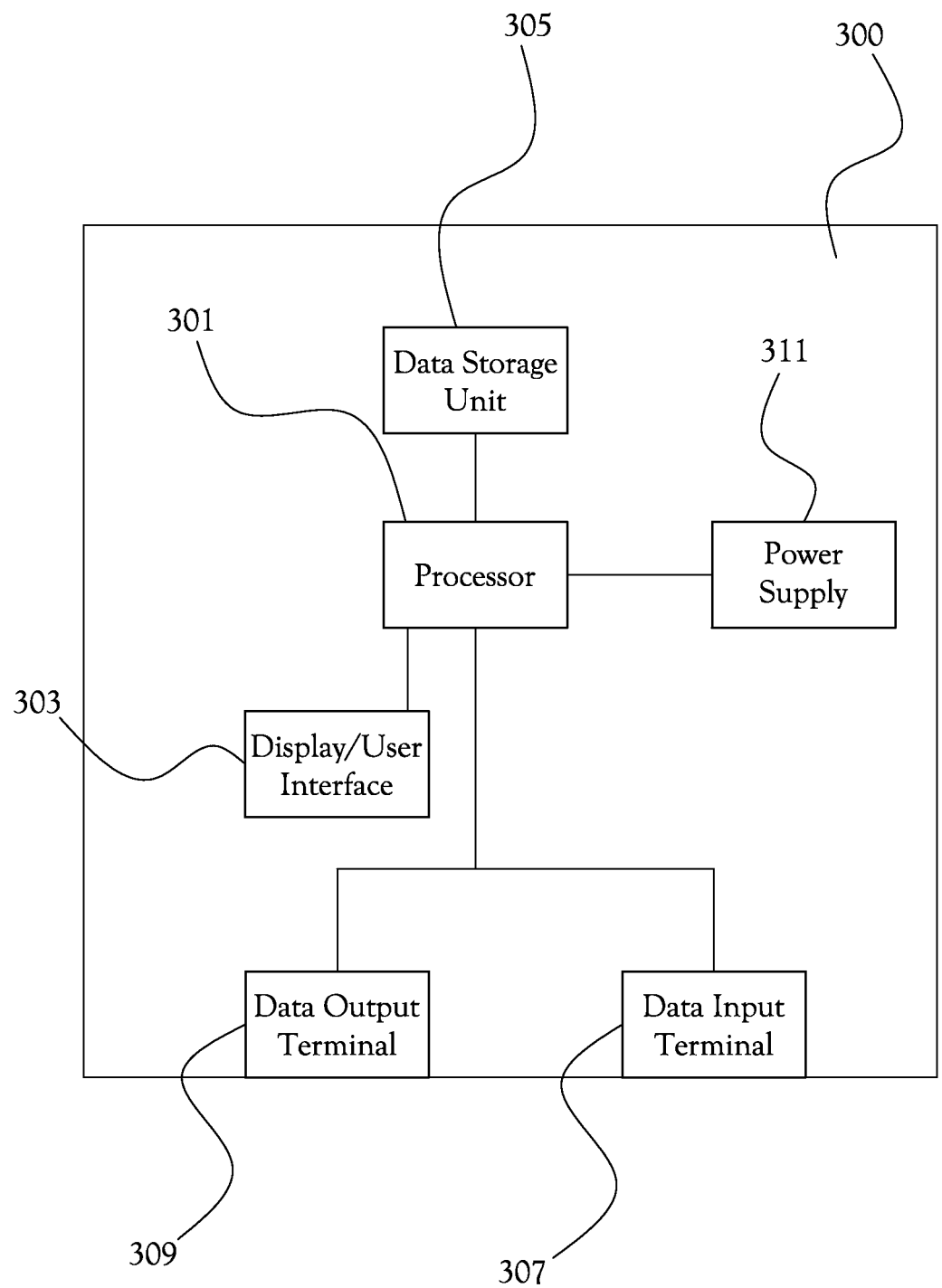
FIG. 3 illustrates an example of a handheld operator control unit according to the present general inventive concept.

FIG. 3 illustrates an example of a handheld operator control unit according an embodiment of the present general inventive concept. In the example embodiment illustrated in FIG. 3, the handheld operator control unit 300 includes a processor 301 in communication with a data storage unit 305, a power supply 311, a display/user interface 303, signal conditioning and processing hardware, a data input terminal 307, and a data output terminal 309. The display/user interface of the operator control unit 300 may include a plurality of user interfaces, such as a touch-screen display, a keyboard, input keys, pointer, scroll wheel, etc. Further, the data input terminal 307 and data output terminal 309 may include a wireless receiver and transmitter, respectively, for establishing a wireless communication link with the data acquisition unit 115. It will be understood by those of skill in the art that the wireless connection contemplated herein may be achieved in accordance with any suitable wireless technique (e.g., ZigBee, IEEE 802.11, Bluetooth, IrDA, etc.).

In various example embodiments of the present general inventive concept, the first and second operator control units 117 and 119 are designed to be utilized in different scenarios. For example, in one embodiment, the first operator control unit 117 may be substantially smaller than the second operator control unit 119. The first operator control unit 117 may be any number of currently-available handheld devices capable of displaying information and establishing a wireless communication link with the data acquisition unit 115, such as a personal digital assistant ("PDA") or iPod®, etc. Similarly, the second operator control unit 119 may be any currently-available portable device capable of displaying data to the operator, establishing a wireless communication link with the data acquisition unit 115, and/or outputting instructions to the data acquisition unit 115. However, various example embodiments of the present general inventive concept may provide for a second operator control unit 119 that is both larger and capable of processing more data than the first operator control unit 117. Examples of such second operator control units 119 may include, but are not limited to, tablets, laptops, etc.

Additionally, various example embodiments of the present general inventive concept may include other control interfaces, such as provided by computers in fixed workstations, to communicate with the DAPU 115 and to perform more complex processing on the data received from the DAPU 115. As discussed later in regard to FIG. 6, various different types of data may be asynchronously processed and provided by the DAPU 115, either to the relatively smaller handheld control units or a larger and less portable type of computer. In various example embodiments of the present general inventive concept, the control unit might act as the master device with the DAPU 115 responding in slave mode to commands issued by the controller. Other example embodiments may allow the DAPU to act as a web server which can be operated through an standard browser application on the control unit. As previously discussed, with the various software modules that are able to perform a plurality of data processing and communication operations in an asynchronous fashion, the DAPU 115 is able to communicate with a variety of control units, and even lose contact with such control units, without affecting the data collection and processing occurring in the DAPU 115.

Figure 4:
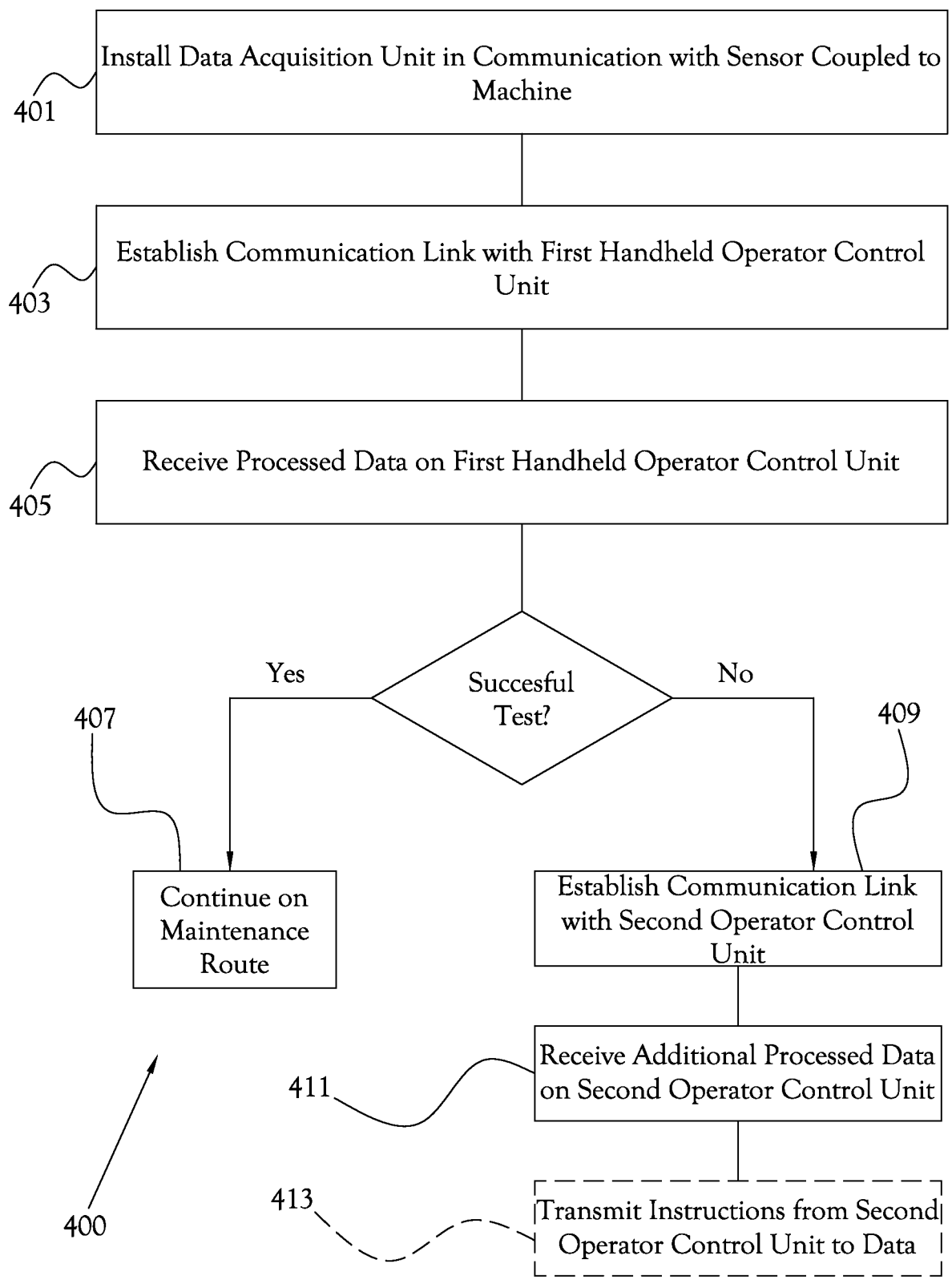
FIG. 4 is a flow chart illustrating operations performed in utilizing two operator control units with a machine analysis system, according to an example embodiment of the present general inventive concept.

FIG. 4 is a flow chart illustrating operations performed in utilizing different operator control units with a machine analysis system, according to an example embodiment of the present general inventive concept. In the example method 400 for utilizing two operator control units illustrated in FIG. 4, in operation 401 the data acquisition unit is provided such that it is communicably coupled to a vibration sensor that has been physically coupled to a machine. In operation 403, a communication link is established between the data acquisition unit and the first handheld operator control unit according to a control signal received from the first handheld operator control unit, and, in operation 405, the data acquisition unit begins to transmit processed data to the first handheld operator control unit according to the commands received. If the processed data received by the first handheld operator control unit indicates that a successful test has been completed, then the maintenance technician may continue on the route in operation 407. However, if the processed data received indicates that the machine-under-test shows abnormal conditions, then the maintenance technician or engineer may elect to use a second control unit in communications with the DAPU to perform more sophisticated testing of the suspect machine as illustrated in operation 409. Once the link has been established between the second operator control unit and the data acquisition unit, additional processed data is transmitted from the data acquisition unit to the second operator control unit in operation 411. If the additional processed data received on the second operator control unit indicates that further processing and analysis should be performed by the data acquisition unit, then instructions may be transmitted from the second operator control unit to the data acquisition unit, as illustrated at 413. Such an operation would typically take place at a later time, and perhaps with a different technician, as the first operator will likely not be carrying both control units. However, the ability to communicate with the different control units illustrates how the DAPU may perform many types of data collection and processing independently of the type of control unit that is sending the control signals and receiving the processing data. This includes situations in which physically different control units are employed, as well as a situation in which the same control unit is updated or reconfigured between communications As previously discussed, a complex set of sequential measurements can be sent to the DAPU along with a description of what data is to be transmitted to the control unit and what data should be stored in the DAPU on a long term basis. These test specifications are cached in the DAPU until cleared by a command from the control unit. As soon as the DAPU receives the first complete test specification, it will execute the measurement and send the specified data transmitted back to the controller and/or store the data in the DAPU. If the communication link is available, the DAPU will begin to transfer the requested data back to the controller as soon as it is available. This is done asynchronously with the data acquisition and processing in order to minimize the total test time required. Since all three activities of data acquisition, data processing, and data transfer take different amounts of time, then best case performance is achieved by executing these processes in parallel. The result is that the total time required for completion of all tasks is only slightly more than the task of greatest duration rather than the sum of all three tasks which would result from sequential single task processing. If the communications link is not available, the DAPU will place the requested data in a temporary storage buffer. When the link is re-established, then the data in this buffer is transferred back to the control unit. An event that will keep the DAPU from completing the full set of measurements specified is an abort command from the controller. If a repeated collection of the same test is desired, the control unit may simply issue a repeat command and not retransmit all of the test specifications. Stated differently, the communication link between the data acquisition unit and the handheld operator control unit(s) is not required to be maintained throughout the entire transmission of the processed data, or through the processing requested by the control unit. If the link is broken during data transmission, then the remaining, un-transmitted data from the DAPU may be transmitted once the communication link is reestablished. The ability of the DAPU to accept a complex set of analysis protocols for processing measured sensor data without any further interaction by the control unit is a significant advantage to the operator allowing him to multi-task and perform other functions such as physical inspections without fear of losing data.

Figure 5:
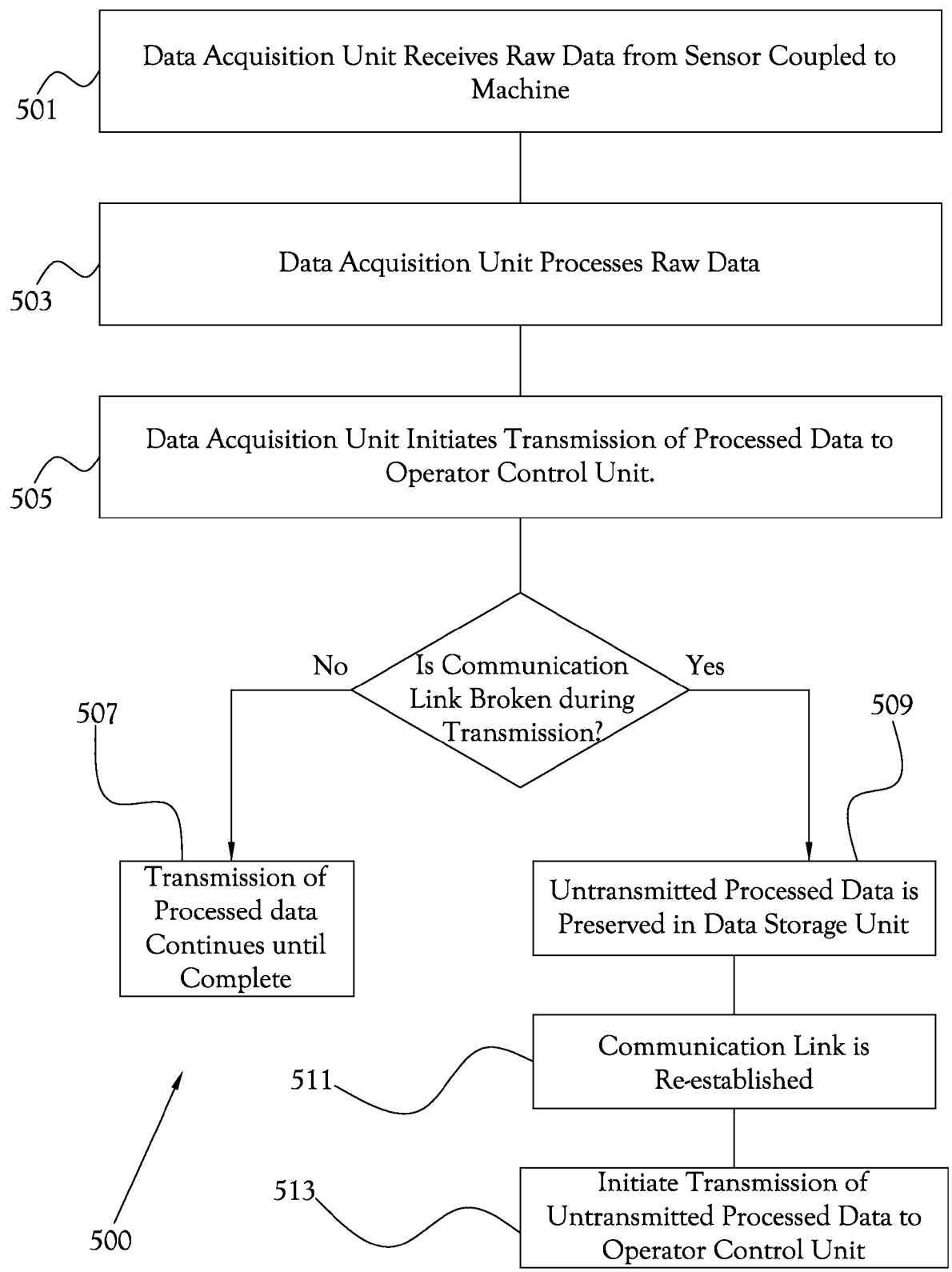
FIG. 5 is a flow chart illustrating operations performed by the data acquisition unit illustrated in FIG. 1, according to an example embodiment of the present general inventive concept.

FIG. 5 is a flow chart illustrating operations performed by the data acquisition unit illustrated in FIG. 1, according to an example embodiment of the present general inventive concept. According to the method 500 of establishing and maintaining a communication link between the data acquisition unit and the operator control unit(s) illustrated in FIG. 5, the data acquisition unit initially receives raw data from the a sensor coupled to a machine in operation 501. In operation 503, the data acquisition unit processes the raw data according to desired analysis metrics. In operation 505, the data acquisition unit initiates transmission of the processed data to a handheld operator control unit. If the communication link between the data acquisition unit and operator control unit is maintained during transmission of the processed data, then the transmission of the processed data continues until all of the applicable processed data has been transmitted, in operation 507. However, in the event that the communication link between the data acquisition unit and the operator control unit is broken during transmission of the processed data, the un-transmitted processed data is preserved in the data storage unit and/or processor of the data acquisition unit, in operation 509. Once the communication link is reestablished between the data acquisition unit and the operator control unit, in operation 511 the data acquisition unit initiates transmission of the un-transmitted processed data to the operator control unit, as illustrated at 513.

Figure 6:
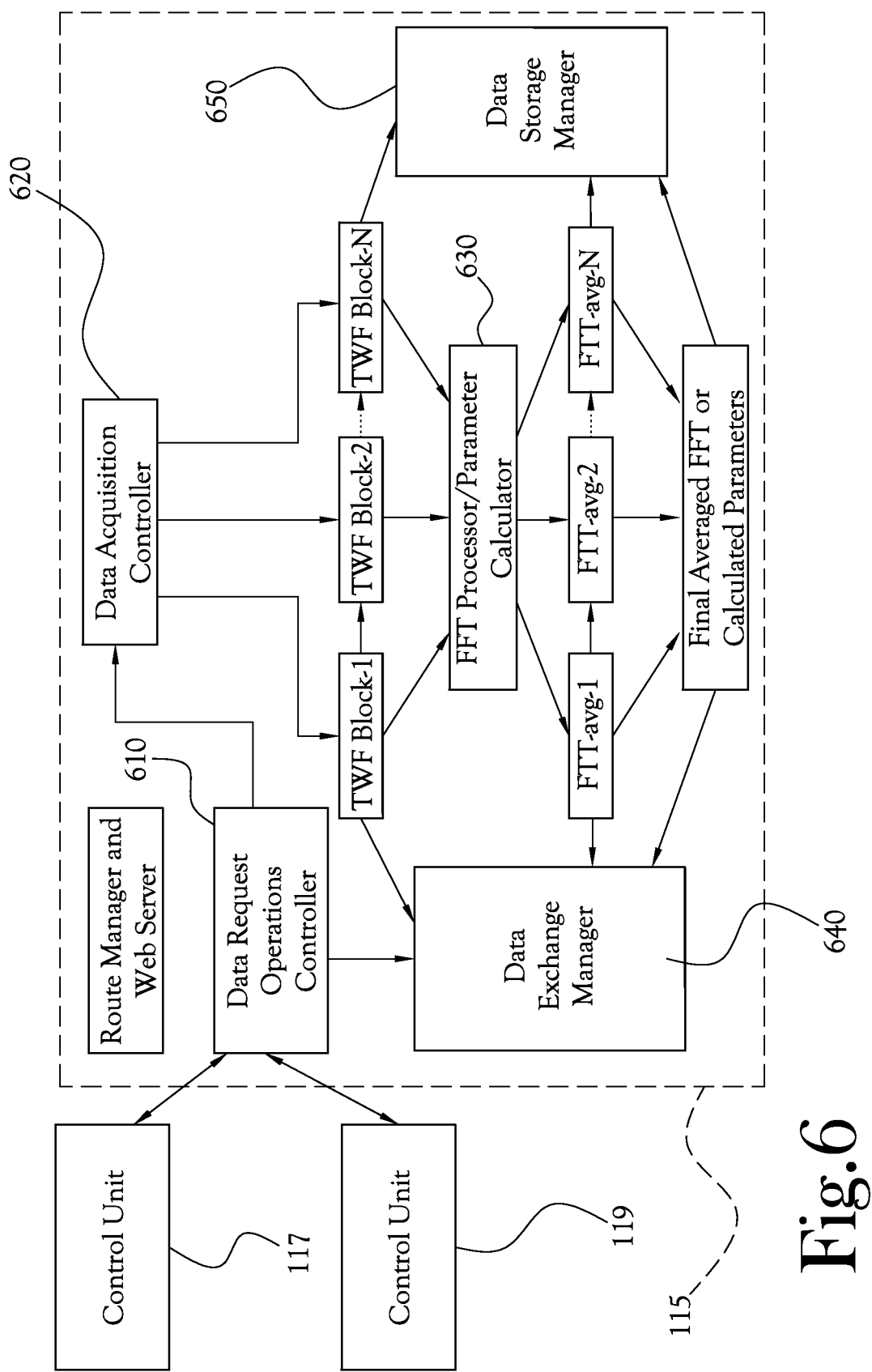
FIG. 6 illustrates an example of the software architecture of a data acquisition unit according to an embodiment of the present general inventive concept.

FIG. 6 illustrates an example of the software architecture of a data acquisition unit according to an embodiment of the present general inventive concept. In this example embodiment, the asynchronous, multi-tasking operation of the data acquisition unit are performed by a data request operations controller 610, a data acquisition controller 620, a fast Fourier transform (FFT) processor/parameter calculator 630, a data exchange manager 640, and a data storage manager 650.

It is understood that either of the control units 117,119 may communicate through a set of programmatic interface transmissions with the data acquisition unit 115 through the data request operations controller 610. Alternatively, the DAPU 115 may behave as a web server and interface with the controller units 117,119 through a browser interface. In this example embodiment, the route might be loaded into the DAPU unit from a local host workstation or from a remote data center over the internet. The controller initiate a standard browser program through which the operator would perform the data collection functions by responding to web pages served to the browser from the DAPU. In this scenario, it may be more efficient to store all of the collected data in the memory onboard the DAPU and, at the conclusion of data collection return to the office to transfer data directly from the DAPU to a workstation or use the web to send the data to a remote data center for further analysis and archiving. In either scenario, all of the requests for measurements to be acquired at one analysis location, the data to be returned for display and/or storage, and the data to be stored internal to the DAPU 115 are sent to the data request operations controller 610, which acts as a command center for the other software modules. In various example embodiments, the control unit 117 may be a simple data collector host, such as a PDA, cell phone, tablet computer, etc., that requests fully processed data to either be transmitted to the control unit 117 or stored in the DAPU 115. Similarly, in various example embodiments, the control unit 119 may be a data analyzer host, such as a tablet computer, that requests that time waveform data be stored or transmitted for more complicated analysis outside the DAPU 115. The data request operations controller 610 may handle requests such as multiple test measurements, data collection types, sampling parameters, transmit/store designations for data, etc.

The requests for individual measurements are passed to the data acquisition controller 620, which initiates data acquisition. In the event that the time waveform (TWF) data is not requested to be directly stored or transmitted to the control unit 117,119, the TWF data may be transmitted to the FFT processor/parameter calculator 630. The identity of the data to be transmitted back to the control unit 117,119 is passed to the data exchange manager 640, which may send requested data to the control unit 117,119 when the communication link is available. Such data to be transmitted by the data exchange manager 640 may include, for example, TWF blocks, FFT averages, a final FFT, various calculated parameters, and the like. Such data that is to be stored internally in the data acquisition unit 115 is transmitted to the data storage manager 650. FIG. 6 illustrates TWF blocks and FFT averages, but the calculated parameters are not limited thereto. Various other parameters calculated from the vibration data, such as, for example, speed, phase, amplitude, and cross channel measurements, etc., and other parameters may also be requested and processed for transmission or storage. As such data is processed asynchronously, the various procedures are not dependent upon the communication link or other concurrent operations. In other words, as the sequential data acquisition process is performed in the DAPU 115, transmissions and storage operations from the same or previous tests may be performed asynchronously. Processed data may be stored while other data is being collected and processed. Also, while a triaxial vibration sensor has been discussed in the descriptions above, the DAPU 115 could just as easily process more channels, and is not limited to the orthogonal measurements normally associated with the triaxial sensor. In the case of the triaxial sensor, all three channels of data may be processed in parallel in order to minimize test time.

Each of the software modules illustrated in FIG. 6 operates asynchronously, waiting for data to be available to perform their respective functions. The FFT processor/parameter calculator begins processing data as soon as the first complete block of time data is available. The time waveform data and/or the results of the signal processing will be stored internally in a temporary buffer if this data is to be returned. If it is not to be returned, only the final averaged calculation may be stored. The data in the temporary buffer will be retained until the data exchange manager 640 and the data storage manager 650 have received the data. This process may continue until all of the requested measurements have been completed.

If the communication link between the control unit 117/119 and the data acquisition unit 115 is lost, the data processing will continue to completion. Upon reestablishing the communication link, the requested processed data will be transmitted to the control unit 117/119. At the conclusion of the data transmission the temporary internal buffer may be flushed, and the requested measurements for the next analysis location may be initiated. The tests requested for a location can be aborted at any time.

The software module architecture illustrated in FIG. 6 minimizes the time required for data transmission by overlapping transmission of processed data corresponding to requested measurements with the collection process corresponding to subsequent measurements, when the communication link is available. Such an architecture is advantageous compared to a synchronous sequential collect and transmit process. This design results in minimum test times when the link is available and yet allows all measurements to continue to completion even in the event that the communication link is unavailable. The loss of the communications link can easily happen in a plant environment if the operator moves away from the machine for safety or convenience, walks around the machine to perform a physical interaction, etc.

The ability to store the route and any or all collected data in the DAPU 115 may also serve to reduce the amount of information that must be transmitted back to the controller unit 117,119. The flexibility and complexity of the software architecture in the DAPU 115 is important in order to require minimal software to be developed for the controller units 117,119. This allows transition to new controller units to be accomplished rapidly as the new controller units appear on the market.

FIG. 6 also illustrates the optional methods for communications between the controller and the DAPU. When the controller application software serves as the master and uses an application program interface protocol to control the DAPU, the communication is directly to Data Request Operations Controller module 610. However, an alternate method for the controller is to execute browser software which allow the DAPU unit to be controlled by responses to web pages served up by the Route Manager and Web Server interface module. The commands from the control unit would flow from here the Data Request Operations controller module 610.

Figure 7:
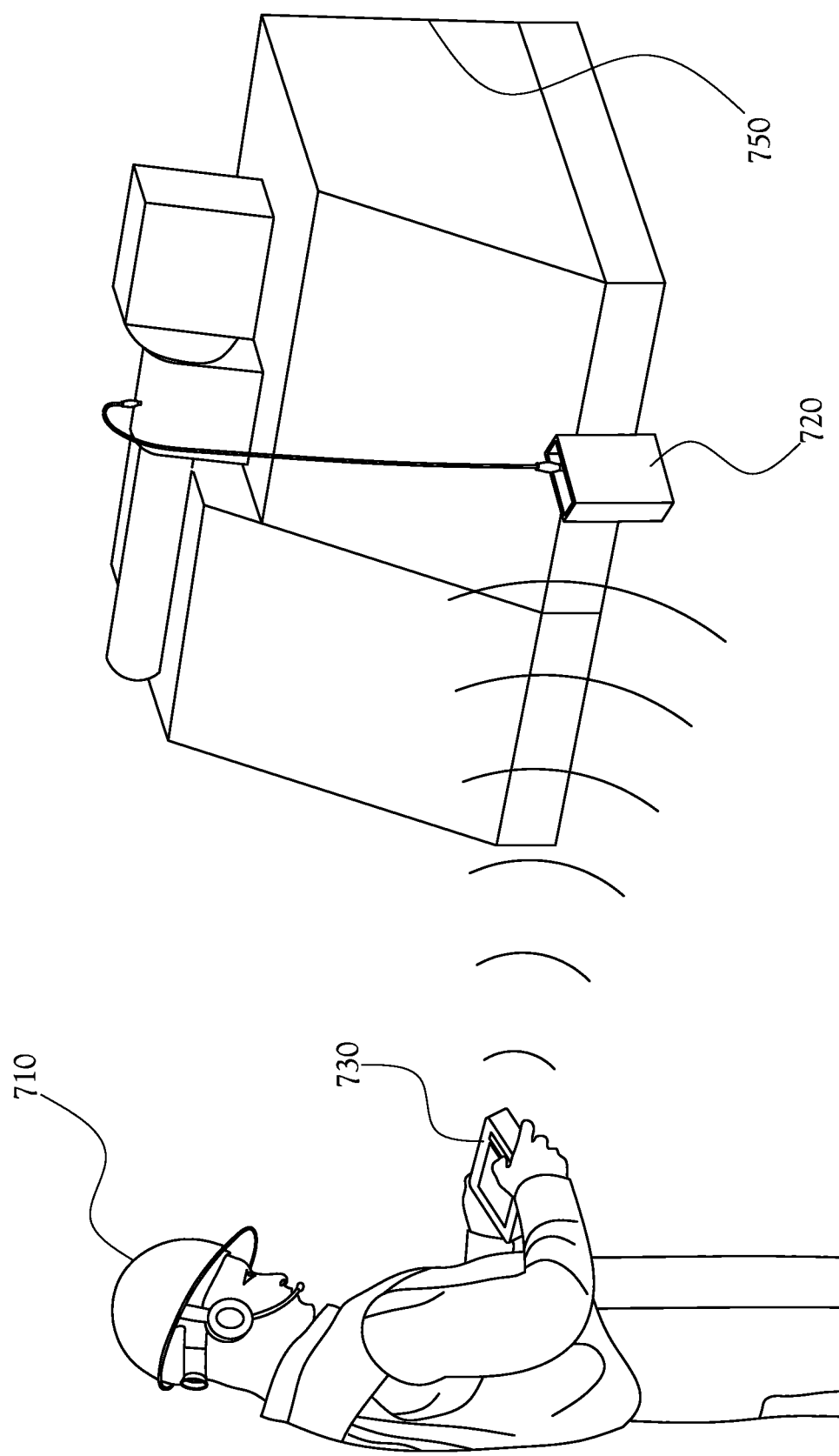
FIG. 7 illustrates a method of data collection according to an example embodiment of the present general inventive concept.

FIG. 7 illustrates a method of data collection according to an example embodiment of the present general inventive concept. As shown in the drawing, a user 710 is able to leave the DAPU 720 at the site of the machine 750 for which the vibration data is being collected, and is able to control the various data acquisition and processing operations remotely with the wirelessly connected control unit 730. As previously described, the DAPU 720 may be selectively controlled by a plurality of different control units. Such a method allows a user to be able to perform such analysis from a safe distance from any potentially hazardous situations. For example, the user may move 30 feet away from the machine 750 to interface with the control unit 730 and cause various control operations to be transmitted to the DAPU 720. It is understood that the distance of 30 feet is merely used to illustrate the mobility of the user and/or control unit relative to the DAPU, and many other distances may be utilized as desired. Additionally, the cable connecting the vibration sensor to the DAPU 720 may be provided with friction type connections so as to be able to easily disconnect, or "tear away", in the event that the DAPU 720 is clipped to the user's belt, or in a pocket or holster of the user, etc. If a dangerous situation is encountered such as the cable of the sensor becoming entangled with a rotating component, this feature would remove or diminish the possibility of the operator being pulled into the machine. Additionally, this feature may facilitate the desire of the operator to attach the sensor and set the DAPU down by the machine while the user makes a quick departure to a location more distant from the machine 750. With such a frictional connection, the user 710 is not tethered to the machine along with the vibration sensor.

According to various embodiments of the present general inventive concept, a predictive maintenance system is provided with a data acquisition and processing unit that communicates with one or more control units such that a user interface is not required at the data acquisition and processing unit. A user may control various data collection and processing operations from the control unit in a remote location, and the data acquisition and processing unit is provided with various software modules able to communicate with a plurality of the control units and process data through asynchronous operations regardless of whether a constant communication link is maintained with the control units. As such, various computing and communication updates can be applied to the control units, and a useful life of the data acquisition and processing unit is extended.

For example, various embodiments of the present general inventive concept provide a two part solution to data acquisition with a reusable DAPU supporting a separate controller, which not limited to a single controller but capable of various tasks through the use of different specific controllers. Portability of such embodiments include wear-ability and operation over distances of, for example, 30 feet. It is also possible to collect data, and store it in the event of a communications loss, then transmit the stored data on restoration of the communications link with the controller.

Still other embodiments will become readily apparent to those skilled in this art from reading the above-recited detailed description in view of all the drawings and figures.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. A vibration analysis system configured to communicate with a sensor to sense vibration data of a machine to be tested, the system comprising:
   a data acquisition and processing unit configured to communicate with at least one sensor while the at least one sensor is fixed to a measuring location of the machine, the data acquisition and processing unit being configured to perform multiple test measurements and to receive a plurality of blocks of raw vibration data from the at least one sensor, and to begin performing a plurality of test operations on received blocks of raw vibration data to create processed vibration data upon receiving a first block of raw vibration data from the at least one sensor, the data acquisition and processing unit being formed separately from the at least one sensor; and
   at least one control unit formed separately from the data acquisition and processing unit, the at least one control unit being configured to transmit at least one operation request from a location remote from the data acquisition and processing unit over a communication link between the at least one control unit and the data acquisition and processing unit, the at least one operation request including a description of specified data to be transmitted to the control unit, the at least one operation request being configured to instruct the data acquisition and processing unit to start receiving raw vibration data from the at least one sensor, to begin performing one or more of the plurality of test operations on received blocks of raw vibration data while the data acquisition and processing unit is receiving additional blocks of raw vibration data, and to begin transmitting the specified data to the control unit over the communication link while the data acquisition and processing unit is still receiving blocks of raw vibration data and performing one or more of the plurality of test operations,
   wherein the data acquisition and processing unit is configured to transmit the specified data to the control unit according to asynchronous, multi-tasking operations such that transmission of specified data to the control unit is overlapped with receiving and processing blocks of raw vibration data by the data acquisition and processing unit.

2. The vibration analysis system of claim 1, wherein the data acquisition and processing unit includes an architecture configured to selectively communicate with a plurality of control units, each control unit having different data processing and portability capabilities such that selection of a particular control unit is based on the different processing and portability capabilities of each control unit, respectively, and wherein each control unit is configured to transmit different operation requests to the data acquisition and processing unit to respectively instruct the data acquisition and processing unit to perform different test operations and to request the data acquisition and processing unit to transmit different types of specified data to a requesting control unit based on a complexity of a particular test operation.

3. The vibration analysis system of claim 2, wherein the plurality of control units includes at least a first control unit and a second control unit, the first control unit being configured as a handheld unit to be carried by a field technician, the first control unit having a first processing capability configured to screen for abnormal conditions that exist in the machine, the second control unit having a second processing capability greater than the first processing capability, the second control unit having an expert diagnostic software application configured to diagnose a cause of an abnormal condition screened by the first control unit.

4. The vibration analysis system of claim 1, wherein the sensor is a triaxial sensor, and the blocks of raw vibration data correspond to three orthogonal axes of vibration which are processed in parallel to reduce test time.

5. The vibration analysis system of claim 1, wherein the at least one control unit is a portable computing device.

6. The vibration analysis system of claim 5, wherein the at least one control unit is a personal digital assistant (PDA), cell phone, tablet computer, or laptop computer.

7. The vibration analysis system of claim 1, wherein the controller and data acquisition and processing unit and all associated sensors and sensor cabling are completely enclosed in belt pouches or pockets or secured by a shoulder strap so that no cables are exposed and a user has both hands free when maneuvering around the machine to position the sensor or traversing from one machine to another.

8. The vibration analysis system of claim 1, wherein the data acquisition and processing unit is mounted in a pouch such that a connected cable or the pouch will break away from the user if the sensor or cable are snagged or become entangled in the machine.

9. A method of communicating with a sensor to sense vibration data of a machine to be tested, the method comprising:
   communicating, through a data acquisition and processing unit, with at least one sensor while the at least one sensor is fixed to a measuring location of the machine, the data acquisition and processing unit receiving a plurality of blocks of raw vibration data from the at least one sensor, and beginning to perform a plurality of test operations on received blocks of raw vibration data to create processed vibration data upon receiving a first block of raw vibration data from the at least one sensor, the data acquisition and processing unit being formed separately from the at least one sensor; and transmitting, from at least one control unit formed separately from the data acquisition and processing unit, at least one operation request from a location remote from the data acquisition and processing unit over a communication link between the at least one control unit and the data acquisition and processing unit, the at least one operation request including a description of specified data to be transmitted to the control unit, the at least one operation request being configured to instruct the data acquisition and processing unit to start receiving raw vibration data from the at least one sensor, to begin performing one or more of the plurality of test operations on received blocks of raw vibration data while the data acquisition and processing unit is receiving additional blocks of raw vibration data, and to begin transmitting the specified data to the control unit over the communication link while the data acquisition and processing unit is still receiving blocks of raw vibration data and performing one or more of the plurality of test operations; and transmitting the specified data from the data acquisition and processing unit to the control unit according to asynchronous, multi-tasking operations such that transmission of specified data to the control unit is overlapped with receiving and processing blocks of raw vibration data by the data acquisition and processing unit.

10. The method of claim 9, wherein the communication link between the at least one control unit and the data acquisition and processing unit is a wireless communication link.

11. The method of claim 9, wherein the data acquisition and processing unit includes a memory to store the specified data for transmission to the control unit until all specified data has been transmitted.

12. The method of claim 11, wherein when the communication link is broken, the data acquisition and processing unit continues performing the one or more test operations until all test operations for each test measurement are complete, and when the communication link is reestablished, the data acquisition and processing unit resumes transmitting stored specified data to the control unit.

13. The method of claim 12, wherein the data acquisition and processing unit is configured to resume transmitting stored specified data to the control unit beginning from the last successful transmission.

14. The method of claim 13, wherein specified data is related to each test measurement in the set, and wherein each test measurement requires a predetermined amount of time to perform the test measurement and to transmit specified data related to the respective test measurement, and wherein the data acquisition and processing unit is configured to perform the set of test measurements asynchronously such that a total time to complete the set of test measurements and to transmit the specified data related to each test measurement in the set is less than a sum of the predetermined amounts of time required to complete and transmit specified data for each test measurement sequentially.

15. The method of claim 9, wherein each control unit of the plurality of control units is configured with different data processing and portability capabilities such that each control unit is configured to transmit different operation requests to the data acquisition and processing unit from a location remote from the data acquisition and processing unit over a communication link between the respective control units and the data acquisition and processing unit, the different operation requests being configured to instruct the data acquisition and processing unit to perform different test operations, respectively, based on a complexity of the different test operations and the processing capabilities of the particular control unit.

16. The method of claim 15, wherein the plurality of control units includes at least a first control unit and a second control unit, the first control unit being configured as a handheld unit to be carried by a field technician, the first control unit having a first processing capability configured to screen for abnormal conditions that exist in the machine, the second control unit having a second processing capability greater than the first processing capability, the second control unit having an expert diagnostic software application configured to diagnose a cause of an abnormal condition screened by the first control unit.

17. The vibration analysis system of claim 1, wherein the data acquisition and processing unit includes a memory to store the specified data for transmission to the control unit until all specified data has been transmitted.

18. The vibration analysis system of claim 17, wherein when the communication link is broken, the data acquisition and processing unit continues performing the one or more test operations until all test operations for each test measurement are complete, and when the communication link is reestablished, the data acquisition and processing unit is configured to resume transmitting stored specified data to the control unit.

19. The vibration analysis system of claim 18, wherein the data acquisition and processing unit is configured to resume transmitting the stored specified data to the control unit beginning from the last successful transmission.

20. The vibration analysis system of claim 19, wherein the one or more of the plurality of test operations includes a set of sequential test measurements, and wherein specified data is related to each test measurement in the set, and wherein each test measurement in the set requires a predetermined amount of time to perform a respective test measurement in the set and to transmit specified data related to the respective test measurement, and wherein the data acquisition and processing unit is configured to perform the set of test measurements asynchronously such that a total time to complete performance of the set of test measurements and to transmit the specified data related to each test measurement in the set is less than a sum of the predetermined amounts of time required to complete performance and transmit specified data for each test measurement in the set sequentially.

21. The vibration analysis system of claim 1, wherein the communication link between the control unit and the data acquisition and processing unit is a wireless link enabling data to be collected by an operator that is 30 feet or more away from the test location where the data acquisition and processing unit has been positioned.

22. The vibration analysis system of claim 1, wherein the communication link between the control unit and the data acquisition and processing unit is a wired link, such as a USB or network cable, enabling data to be collected by an operator at distances up to a length of the cable away from the data acquisition and processing unit positioned proximate the test location.

23. A vibration analysis system configured to communicate with a sensor to sense vibration data of a machine to be tested, the system comprising:

a data acquisition and processing unit configured to communicate with at least one sensor while the at least one sensor is fixed to a measuring location of the machine, the data acquisition and processing unit being configured to perform multiple test measurements and to receive a plurality of blocks of raw vibration data from the at least one sensor, and to begin performing a plurality of test operations on received blocks of raw vibration data to create processed vibration data upon receiving a first block of raw vibration data from the at least one sensor, the data acquisition and processing unit being formed separately from the at least one sensor and having a memory to store vibration data; and at least one control unit formed separately from the data acquisition and processing unit, the at least one control unit being configured to transmit at least one operation request from a location remote from the data acquisition and processing unit over a communication link between the at least one control unit and the data acquisition and processing unit, the at least one operation request including a description of specified data to be transmitted to the control unit, the at least one operation request being configured to instruct the data acquisition and processing unit to start receiving raw vibration data from the at least one sensor, to begin performing one or more of the plurality of test operations on received blocks of raw vibration data while the data acquisition and processing unit is receiving additional blocks of raw vibration data, and to begin transmitting the specified data to the control unit over the communication link, wherein when the communication link is broken, the data acquisition and processing unit continues performing the one or more of the plurality of test operations until the one or more of the plurality of test operations are complete, and any specified data not transmitted to the control unit is stored in the memory for subsequent transmission, and when the communication link is re-established, the data acquisition and processing unit begins to transmit stored specified data to the control unit.

24. The vibration analysis system of claim 23, when the communication link is reestablished, the data acquisition and processing unit is configured to resume transmitting stored specified data to the control unit beginning from the last successful transmission.

25. The vibration analysis system of claim 23, wherein the multiple test measurements are performed on a set of machines located on a route of machines to be tested, and wherein the at least one operation request includes a description of vibration data to be stored in the memory for subsequent transfer after the multiple test measurements have been performed on the set of machines.

26. The vibration analysis system of claim 23, wherein the one or more of the plurality of test operations includes a set of sequential test measurements, and wherein specified data is related to each test measurement in the set, and wherein each test measurement in the set requires a predetermined amount of time to perform a respective test measurement in the set and to transmit specified data related to the respective test measurement, and wherein the data acquisition and processing unit is configured to perform the set of test measurements asynchronously such that a total time to complete performance of the set of test measurements and to transmit the specified data related to each test measurement in the set is less than a sum of the predetermined amounts of time required to complete performance and transmit specified data for each test measurement in the set sequentially.

27. A vibration analysis system configured to communicate with a sensor to sense vibration data of a machine to be tested, the system comprising:
   a data acquisition and processing unit configured to communicate with at least one sensor while the at least one sensor is fixed to a measuring location of the machine, the data acquisition and processing unit being configured to perform multiple test measurements and to receive a plurality of blocks of raw vibration data from the at least one sensor, and to begin performing a plurality of test operations on received blocks of raw vibration data to create processed vibration data upon receiving a first block of raw vibration data from the at least one sensor, the data acquisition and processing unit being formed separately from the at least one sensor; and
   a plurality of control units formed separately from the data acquisition and processing unit, each control unit having different data processing and portability capabilities such that each control unit is configured to transmit different operation requests to the data acquisition and processing unit from a location remote from the data acquisition and processing unit over a communication link between the respective control units and the data acquisition and processing unit, the different operation requests being configured to respectively instruct the data acquisition and processing unit to perform different test operations based on a complexity of the different test operations, the operation requests being configured to instruct the data acquisition and processing unit to start receiving raw vibration data from the at least one sensor, to begin performing the different test operations on received blocks of raw vibration data while the data acquisition and processing unit is receiving additional blocks of raw vibration data, and to begin transmitting specified data related to the different test operations to a particular control unit based on the processing capabilities of the particular control unit while the data acquisition and processing unit is still receiving blocks of raw vibration data and performing the different test operations.

28. The vibration analysis system of claim 27, wherein the plurality of control units includes at least a first control unit and a second control unit, the first control unit being configured as a handheld unit to be carried by a field technician, the first control unit having a first processing capability configured to screen for abnormal conditions that exist in the machine, the second control unit having a second processing capability greater than the first processing capability, the second control unit having an expert diagnostic software application configured to diagnose a cause of an abnormal condition screened by the first control unit.

* * * * *